W. L. FISH.
Mechanism for Operating Bobbin-Winding Attachment for Sewing-Machine.
No. 8,687. Reissued April 22, 1879.
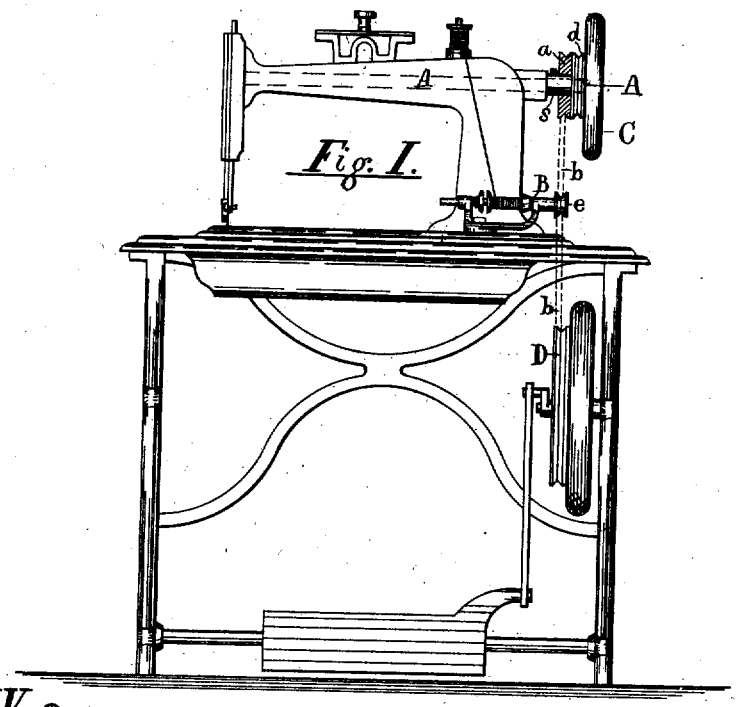
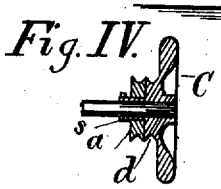
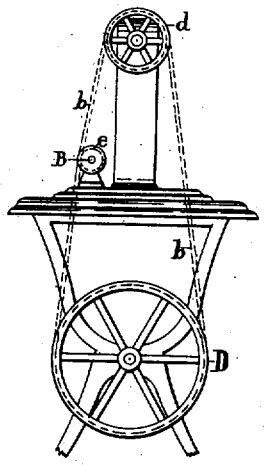
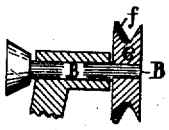
Attest:
Thos. S. Crane.
Oliver Drake
Inventor.
Warren L. Fish
N. PETERS, PHOTO-LITHOGRAPHER, WASHINGTON, D. C.

UNITED STATES PATENT OFFICE.

WARREN L. FISH, OF NEWARK, NEW JERSEY.

IMPROVEMENT IN MECHANISMS FOR OPERATING BOBBIN-WINDING ATTACHMENTS FOR SEWING-MACHINES.

Specification forming part of Letters Patent No. 123,625, dated February 13, 1872; Reissue No. 8,687, dated April 22, 1879; application filed January 9, 1879.

*To all whom it may concern:*

Be it known that I, WARREN L. FISH, of the city of Newark, in the county of Essex and State of New Jersey, have invented a new and useful Improvement in the Mechanism for Operating Bobbin-Winding Attachments for Sewing-Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 represents a side elevation, partly in section, of a sewing-machine embodying my invention. Fig. 2 is an end view of the same. Fig. 3 is a detail central section of the arbor, &c., containing bobbin-winding pulley; and Fig. 4, a view illustrating the arrangement of fly-wheel and pulley on the shaft.

Similar letters of reference indicate corresponding parts in each of the several figures.

The object of this invention is to devise means for operating a bobbin-winder on a sewing-machine without at the same time necessarily operating the sewing mechanism thereof.

Usually bobbin-winding attachments are so arranged as to be thrown into gear with the operating mechanism of the machine, and all parts of the machine are moved whenever the bobbin-winder is operated; and if the thread gives out while sewing the work is removed from the machine to permit the winding of a new bobbin. Apart from this inconvenience, much power is wasted in thus unnecessarily moving parts of the machine.

My invention consists in the means whereby the driving-power of a machine can be transferred to the bobbin-winder, so that the sewing mechanism will be at rest while said bobbin-winder is being operated, and vice versa.

My object is principally attained by the application of a loose pulley, *a*, supported by the main shaft A of a sewing-machine, so that the belt *b*, which imparts rotary motion to the shaft A by passing around a fast pulley, *d*, thereon, can at any time be slipped off the pulley *d* and transferred to the equal-sized loose pulley *a*, whereby all power of the belt will be taken from the shaft A and no further motion be imparted to the same.

B is the driving-arbor of the bobbin-winder, and carries a friction-pulley, *e*, which is in line with the loose pulley *a*, and arranged in such manner that when the belt is transferred to the pulley *a* it will also be brought in contact with the edge of pulley *e*. When, however, the belt is on the pulley *d*, it will not be in contact with pulley *e*. Thus it will be seen that when the sewing mechanism of the machine is in operation the bobbin-winder will be at rest, and when the bobbin-winder is in motion the sewing mechanism will be at rest, and therefore all the aforementioned difficulties are entirely overcome.

In order to aid in securing the desired effect of the belt *b* on the bobbin-winder, I consider it advisable to so prepare the edge of the pulley *e* that it will be sure to be revolved when the belt is in contact with it, even should the belt be somewhat slack; and for this purpose I insert within the groove of the pulley *e* an annular piece, *f*, of rubber or equivalent material, which, when in contact with the material of the belt, will cause it to adhere better than it would to the metal or material of which the pulley proper consists.

The ring *f* being inclined serves also to crowd the belt into the bottom of the groove, and so insures its taking proper hold. There may, if desired, be two such rings placed against the opposite sides of the groove in the pulley *e*, or a grooved ring of rubber or leather may be slipped over the smooth edge of pulley *e*, in which case the entire outer edge of the said pulley would be composed of the elastic material.

In order to prevent the wear and tear which might result to the main shaft from the revolving pulley *a* in operating the bobbin-winder, a sleeve, *s*, is rigidly secured to the main shaft A, upon which sleeve said pulley revolve when the bobbin-winder is being operated. As shown in Fig. 1 of the drawings, said sleeve forms an extension of the hub of the balance or fly wheel C, which is, as already indicated, rigidly secured to and revolves with the main shaft A, which is driven by the driving or crank-shaft pulley D, as will be readily understood.

Having thus described my invention, what I claim, and desire to secure by Letters Patent, is—

1. The combination of the sewing-machine carrying a loose pulley upon its main shaft, a driving-pulley, D, and belt, and a bobbin-winder arranged with its pulley in a line with the loose pulley, whereby the bobbin-winder is operated by contact with the said belt while the sewing mechanism is motionless, substantially as set forth.

2. The combination, in a sewing-machine, of the driving-pulley D and belt, the main shaft carrying a balance or fly and pulley wheel, and an independently-revolving pulley with a bobbin-winder, as set forth, whereby the bobbin-winder may be operated while the sewing mechanism remains motionless.

3. The combination, in a sewing-machine, of the driving pulley and belt, the main shaft, a balance or fly wheel rigidly secured thereto and having a projecting hub or sleeve, a pulley revolving on said hub independently of said wheel, and a bobbin-winder, whereby the bobbin-winder may be operated while the sewing mechanism remains motionless.

4. The combination of a loose pulley, *a*, fast pulley *d*, and bobbin-pulley *e*, arranged with respect to each other and to the crank-shaft pulley, as described, so that the bobbin-winder may be operated by means of the same belt which operates the sewing mechanism while the latter remains motionless, for the purposes set forth.

In testimony that I claim the foregoing as my invention I hereto subscribe my name in presence of two witnesses.

WARREN L. FISH.

Witnesses:

OLIVER DRAKE,

THOS. S. CRANE.